United States Patent [19]

Schreiber

[11] Patent Number: 4,907,087
[45] Date of Patent: Mar. 6, 1990

[54] TRANSMISSION OF SIGNALS THROUGH ANALOG CHANNELS USING ADAPTIVE FREQUENCY MODULATION

[75] Inventor: William F. Schreiber, Cambridge, Mass.

[73] Assignee: Massachusetts Institute of Technology, Cambridge, Mass.

[21] Appl. No.: 61,140

[22] Filed: Jun. 10, 1987

[51] Int. Cl.⁴ .................. H04B 1/10; H04B 15/00; H04N 5/21; H04N 5/40
[52] U.S. Cl. ............................... 358/186; 358/167; 358/23; 455/44
[58] Field of Search ............... 358/166, 167, 36, 340, 358/186, 138, 23; 455/42, 43, 44, 110, 112, 205; 375/78; 380/11

[56] References Cited

U.S. PATENT DOCUMENTS

| | | | |
|---|---|---|---|
| 4,007,483 | 2/1977 | Pham van Cang | 358/4 |
| 4,607,285 | 8/1986 | Hirota | 358/167 |
| 4,618,893 | 10/1986 | Hirota | 358/167 |

OTHER PUBLICATIONS

"A Two-Channel Picture Coding System II: Adaptive Companding and Color Coding," IEEE Transactions on Communications, vol. COM-29, No. 12, Dec. 1981, by W. F. Schreiber and R. R. Buckley.

Primary Examiner—Tommy P. Chin
Attorney, Agent, or Firm—Fish & Richardson

[57] ABSTRACT

Improved efficiency of frequency-modulated (FM) transmission of signals through analog channels, i.e., achievement of a higher bandwidth and/or signal-to-noise ratio (SNR) in the received signal for a given channel bandwidth and channel carrier-to-noise ratio (CNR), is accomplished by adaptive adjustment of the modulation index in such a manner that the spectrum of the channel signal more nearly occupies the entire channel more of the time than it would otherwise. Data is transmitted, along with the signal, to enable the receiver to calculate the modulation index at each instant so that the signal can be properly demodulated. The invention has application to FM transmission of signals representing visual image or other information, such as sound, for which human perception of noise is greatest in areas of low amplitude and/or frequency and reduced in and immediately adjacent to areas of high amplitude and/or frequency.

59 Claims, 5 Drawing Sheets

TRANSMISSION OF SIGNALS THROUGH ANALOG CHANNELS USING ADAPTIVE FREQUENCY MODULATION

BACKGROUND OF THE INVENTION

This invention relates to frequency modulation ("FM") transmission, and particularly to FM transmission of signals representative of visual images and sound.

In FM transmission, the instantaneous frequency, f, of a carrier wave is made proportional to an information signal, x(t), so that the signal in the channel, y(t), is given by:

$$y = \cos 2\pi f t = \cos 2\pi (f_0 + mx)t,$$

where m, the modulation index, is the proportionality factor between the input signal and the instantaneous frequency and $f_0$ is the unmodulated carrier frequency. FM has two characteristics that make it desirable for transmission, and particularly for transmission of video signals in certain cases. One is its ability to exchange bandwidth and signal-to-noise ratio (SNR), i.e., by making the channel bandwidth higher than the input signal bandwidth, the received SNR can be made higher than the channel carrier-to-noise ratio (CNR). This is very useful in satellite transmission. The other is that, since the receiver is sensitive primarily to the frequency of the modulated signal, it is relatively insensitive to amplitude variations such as may occur due to "drop-outs" in magnetic recording.

The relationship between the input signal and the spectrum of the rf (radio frequency) signal in FM is quite complex, but, broadly speaking, the bandwidth of the rf signal is proportional both to the amplitude and frequency of the input. Thus in areas of an image having large-amplitude, fine detail, the rf bandwidth is large, while in relatively blank areas, the rf bandwidth is small. As it happens, noise in the received signal, from whatever cause, is most noticeable in the blank areas and least noticeable in the highly detailed, or "busy" areas. In fact, if noise is of a level as to be moderately annoying in the blank areas, it is completely invisible in the detailed areas.

Because of the relationship between the input signal and the rf bandwidth, the choice of modulation index in conventional systems is a tradeoff between noise visibility in relatively blank areas and distortion in highly detailed, high-contrast areas caused by truncation of the rf spectrum due to the fixed channel bandwidth. It is best not to choose the index so as absolutely to eliminate all distortion, since this would needlessly sacrifice SNR in blank areas. Some distortion of extreme slopes and/or amplitudes in the video, such as caused by specular highlights, is preferable.

Several methods have been used in partially successful attempts to improve the tradeoff discussed above. A linear method (Hirota U.S. Pat. No. 4,607,285) pre-emphasizes the spatial high-frequency components, both vertical and horizontal, before modulation and de-emphasizes them afterward. Several nonlinear methods have been used in which high-amplitude transients are emphasized less than low-amplitude transients, permitting a higher degree of pre-emphasis of the low-level detail (Hirota U.S. Pat. No. 4,618,893). In another nonlinear method, the amount of pre-emphasis is made to depend on the level of the (pre-emphasized) signal, and in still another (van Cang U.S. Pat. No. 4,007,483), the high-frequency components, principally the color subcarrier and its sidebands, are subjected to a nonlinear compression before modulation and a nonlinear expansion afterwards (the entire process is called static companding) so that some noise is shifted from areas of low-level detail to areas of high level detail. Some of these processes may also be combined.

In the paper, "A Two-Channel Picture Coding System II: Adaptive Companding and Color Coding," IEEE Transactions on Communications, Vol. COM-29, No. 12, December 1981, by W. F. Schreiber and R. R. Buckley, a system for reducing the visibility of quantization noise is described. In that system, the image is divided into small blocks, typically $3 \times 3$ to $8 \times 8$ picture elements (samples or "pels"). In each block, a value of a gain factor is found such that when the signal is multiplied by the factor, the multiplied signal just does not exceed the maximum permissible amplitude of the channel. At the receiver, the received signal is divided by the same factor, thus reducing the noise by the same amount in those areas where the signal, being small, can be multiplied by a factor larger than unity. To avoid block effects, the factor used at each pel is determined from the block factor by 2-dimensional interpolation, and thus the factor varies smoothly from pel to pel. The block factors are transmitted along with the signal, but they do not consume much channel capacity. The methods discussed in the paper operate independently on successive frames of a TV signal and do not take advantage of the special properties of electrical representations of moving images.

SUMMARY OF THE INVENTION

In general the invention features improvement in the efficiency of the frequency modulated (FM) transmission of signals through analog channels, i.e., achievement of a higher bandwidth and/or signal to-noise ratio (SNR) in the received signal for a given channel bandwidth and channel carrier-to-noise ratio (CNR). This is accomplished by adaptive adjustment of the modulation index in such a manner that the spectrum of the channel signal more nearly occupies the entire channel more of the time than it would otherwise. Data is transmitted, along with the signal, to enable the receiver to calculate the modulation index at each instant so that the signal can be properly demodulated. The invention has application to FM transmission (including recording or storing) of signals representative of information, such as sound or the high-frequency content of a visual image, for which human perception of noise is greater in areas of low amplitude and/or frequency and reduced in and immediately adjacent to areas of high amplitude and/or frequency.

In order to use the highest possible value of modulation index in those areas where noise is most perceptible, the signal should be as small as possible in such areas. Audio signals have this characteristic naturally, but video signals do not, as blank areas in images can have any value. Therefore, in the case of video, the signal is divided into low and high-frequency components ("lows" and "highs"); the lows are transmitted by any means while the highs are transmitted by adaptively varying the modulation index so as to widen the short-term spectrum in those areas where the highs are relatively low in value (areas of low "activity" or "busyness"), where noise would be most visible, and where normally the spectrum would not fill the channel. The invention provides improved SNR in such areas for a given channel bandwidth, or reduced channel bandwidth for the same SNR, or some combination of both effects. When the modulation index is fixed, much of the assigned rf bandwidth is not used in the relatively blank areas, and this is the source of inefficiency in conventional systems. By causing the channel to be more nearly full most of the time, the efficiency of channel utilization is increased. The system is so effective in suppressing noise where it normally would be most visible that the maximum modulation index may be decreased, resulting in less spectrum truncation, and therefore less distortion, in areas containing high-contrast fine detail, thus giving improved quality in all parts of the image.

Whatever the method of adaptation used, the factor will be very large (and constant) in large areas having very small but constant busyness. Within such areas, but not at their edges, the effect is quite similar to static companding. In fact, the adaptation produces a companding effect that is, in general, larger than normally achieved with the prior-art static methods. In that case, the degree of companding may be larger than desired. It is thus within the scope of the invention to include, along with the adaptive system, a static nonlinearity at the transmitter and its inverse at the receiver. This static nonlinearity may sometimes be in the reverse sense from that of a prior-art compander.

In the case of audio, the signal is already in AC form, and there is no need to separate out the highs. The entire signal is transmitted by adaptive FM modulation in a similar fashion to that used for the highs in the video application.

In preferred embodiments, the image is divided into blocks of equal size, which may be one, two, or three dimensional (x, y, and t); a unique modulation index is assigned to the center of each block; and spatial and/or temporal interpolation is used to choose the modulation index at points located between the centers of blocks.

A variety of procedures can be used for choosing the modulation index. It can be made a function (e.g., nonlinear) of an image characteristic (e.g., the highest magnitude or rate of change of the high-frequency component within the block, or the largest pel-to-pel horizontal difference in a block, or a linear combination of such characteristics) that is correlated with the width of the short-term spectrum of the modulated carrier, i.e., the spectrum corresponding to the small area of the image for which the modulation index is being chosen (e.g., the spectrum for a time interval corresponding to the width of a block). The short-term spectrum of the modulated carrier can be determined in real time for different areas of the image, and the modulation index increased in those areas where less than the available bandwidth is being used. The transmission error across the channel (owing to the short-term spectrum exceeding the available bandwidth) can be increased until a predetermined small error results. The modulation index is varied sufficiently gradually across the image as to make the modulation more linear than that provided by static nonlinear companding.

Various methods may be used to compute the index. It may be computed in a single pass if based on an image characteristic. A block-recursive procedure may also be used in which: (1) the index is varied for a particular block, (2) the effect on distortion (either across the block or at individual picture elements) is determined by examining a measure or predictor of that distortion, and (3) a decision is made, based on the degree of distortion, whether to further increase the index. A logarithmic search can be used to vary the index, and the search can be started with the index used for the same block in the previous frame. Alternatively, a frame recursive procedure can be used, in which the index for a block in the current frame is based, at least in part, on the index used for the same block in the previous frame and on a measure of the distortion that resulted in the previous frame.

The signal to which the adaptive frequency modulation is applied may be either a component or composite, color-television signal. A monochrome signal may be spectrally divided into lows and highs. A composite signal may be spectrally divided into lows and composite highs. A component signal may be divided into mixed-highs and separate lows.

The low-frequency components and adaptation information (modulation indexes for individual blocks) can be transmitted separately across either digital or analog channels, and the low-frequency component may be subsampled prior to transmission.

In preferred embodiments in which the signal being transmitted (or recorded) is sound, a different modulation index is assigned to successive blocks of time in the signal. The index for a particular sample is based on an asymmetrically located block (e.g., 250–500 msec long), extending further before the sample in time (e.g., 200–400 msec) than after it (e.g., 50–100 msec). The asymmetry accounts for the fact that noise just before a loud passage is masked less than noise just afterwards.

In distinction to prior-art methods that use static companding, the modulation provided by the invention, due to the smooth variation of adaptation factor from pel to pel, is perfectly linear at each point in the image. This means that the noise level at each point depends on the image "activity" in the neighborhood of the point (in the spatiotemporal neighborhood in the 3-dimensional case) as is most advantageous considering the masking effect of the detail content. That is, detail at one point suppresses noise visibility in an area around that point, so that the adaptation factor should depend, for optimum noise performance, on the detail surrounding that point and not on the signal value at that point alone, as in the prior-art methods.

Another distinction from the static companding methods of the prior art is that a much higher degree of companding, and thus a higher degree of noise reduction, is achieveable. In static companding, the noise suppression in low-amplitude areas is limited by the ratio of slopes of the companding curve from the lowest to the highest input signal value. It is not feasible to have extremely high slope ratios using either analog or digital circuitry, because of limitations of accuracy in one case and quantization noise in the other. Ten to one would be considered a rather high ratio in the static case, whereas in the adaptive case, there is no fundamental limitation on the degree of companding. We have used ratios greater than ten, even as high as 32 in some cases, and we expect that even higher ratios are feasible.

Other features and advantages of the invention will be apparent from the following description of a preferred embodiment and from the claims.

DESCRIPTION OF THE PREFERRED EMBODIMENT

Figure 1:
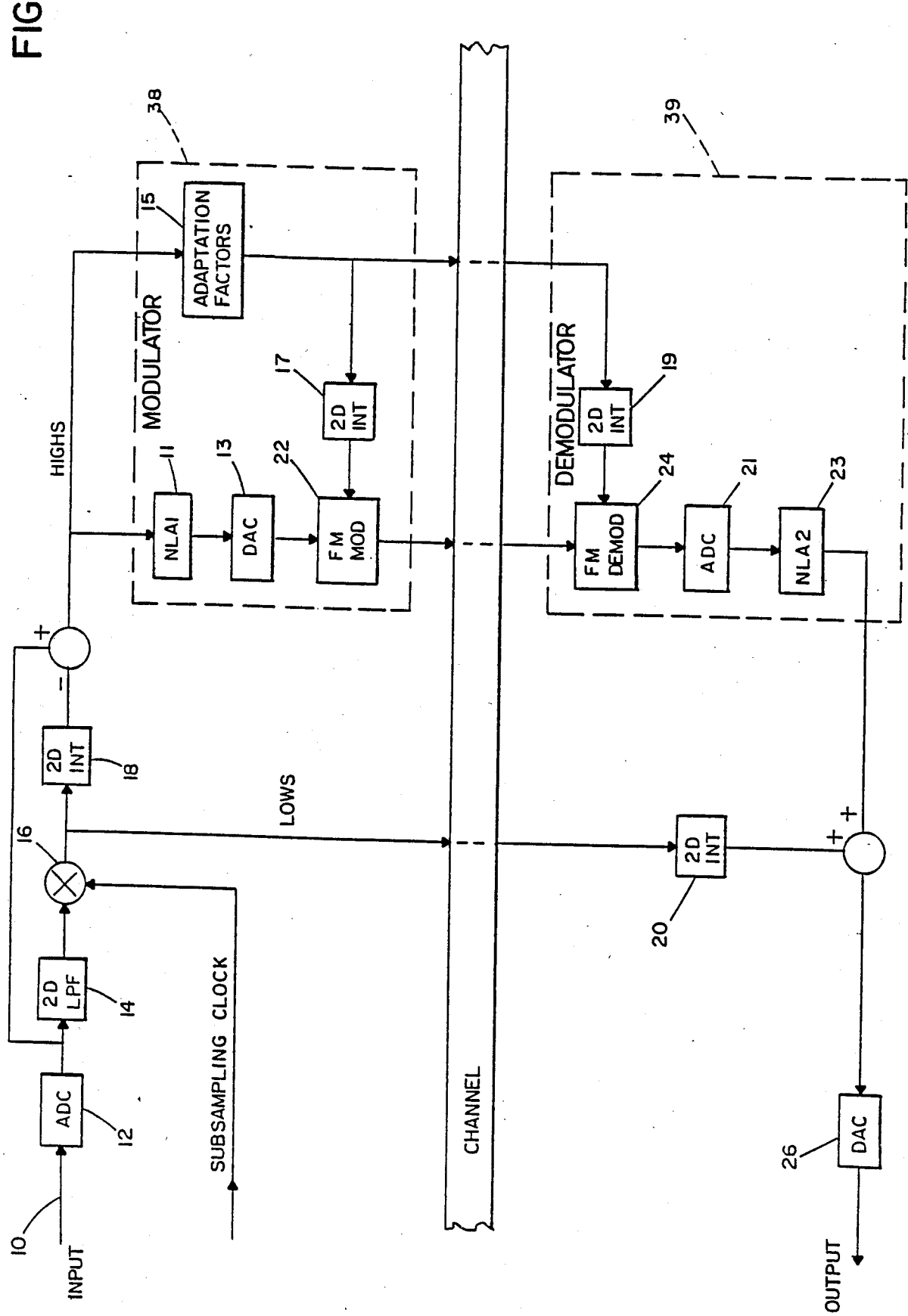
FIG. 1 is a block diagram of a preferred embodiment of the invention for transmitting a monochromatic video signal.

A block diagram of the preferred embodiment for transmitting (or recording or storing) monochrome video signals is shown in FIG 1. Analog video input 10 is digitized by analog-to-digital converter 12 using 8 bits (256 luminance levels) per pel. Two-dimensional low-pass filter 14 of the type described in my U.S. Pat. No. 4,268,861, substitutes at each pel a weighted average of luminance levels at surrounding pels. The resulting lows signal is then subsampled at element 16 by a factor of 4 in each direction (16 on an area basis). (In the case of interlaced pictures, it is advantageous to have the block wider than high in terms of pels so that its shape in the image is more nearly symmetrical.) The subsampled signal is transmitted by any prior-art method, e.g., digitally in a separate digital channel, or converted into analog form and transmitted as a low-bandwidth analog signal.

An advantageous method of transmitting the lows signal is by use of a technique now known as multiplexed analog components (MAC). In MAC systems, the signals to be transmitted are time-compressed and delayed as needed so that they can be transmitted alternately through a single channel. When FM is used in MAC systems, the relative degree of time-compression can be used to control the relative amount of noise added to the signals in transmission. Since by far the highest proportion of channel time is related to the highs signal, it costs little in channel capacity to allocate enough time to the lows signal to achieve a suitable SNR. Of course, audio and adaptation signals can also be time-multiplexed in this way.

To avoid error accumulation, the highs signal is formed by subtracting, from the input signal, a reconstructed lows signal, the latter being formed by interpolating, in element 18, the subsampled signal produced by element 16. This procedure insures that the sum of the "lows" and "highs" is precisely equal to the original signal.

For transmission, the highs signal is passed through a first nonlinear amplifier 11 (which together with a complementary nonlinear amplifier in the receiver provides static companding) and converted into analog form by digital-to-analog converter 13 and applied to FM modulator 22, making use of the calculated modulation index (or, equivalently, the adaptation factor), which varies from pel to pel. The modulation index selector 15, which may be of any of the types described below, computes one value of modulation index per block, and this value is applied to the interpolator 17 and also transmitted to the receiver by either analog or digital means. The size of the block over which each value of index is calculated may correspond to the subsampling factor of the lows signal, or may be larger or smaller. In the embodiments reduced to practice by computer simulation, various sizes have been used. At both transmitter and receiver, the modulation index used at each pel is calculated from the block index by 2-dimensional interpolators 17, 19.

At the receiver, the FM signal is demodulated in element 24 making use of the index calculated by interpolator 19, converted into digital form by analog-to-digital converter 21, and then passed through a second nonlinear amplifier 23, which has a transfer characteristic complementary to that of the first nonlinear amplifier so as to restore the signal to its linear form. The subsampled lows signal (shown as transmitted and received in digital form) is interpolated by element 20, which is identical to element 18 at the transmitter. The interpolated lows signal is added to the highs signal and converted back into analog form by digital-to-analog converter 26.

Some conventional, required elements have been omitted for clarity in FIG. 1 and other figures. For example, filters of necessity have delay, so that when outputs of various signals, some of which are filtered, are combined, it is necessary to add compensating delays so that the various signal components are suitably registered with each other; such delays are not shown. In addition, whenever signals that are represented by samples are to be combined, they must have the same number of samples per unit distance or per unit time referred to the original image. In the case of signals that result from subsampling (also called down-conversion or down-sampling), interpolation (also called up-conversion or up-sampling) is required to restore the sampling density to the nominal value.

An alternative companding method is to insert the nonlinearity at transmitter and receiver between the interpolators and the modulator or demodulator, as the case may be. This method gives a somewhat different treatment to the signal at the boundaries between blank and busy areas, which may be advantageous in some circumstances.

Figure 2:
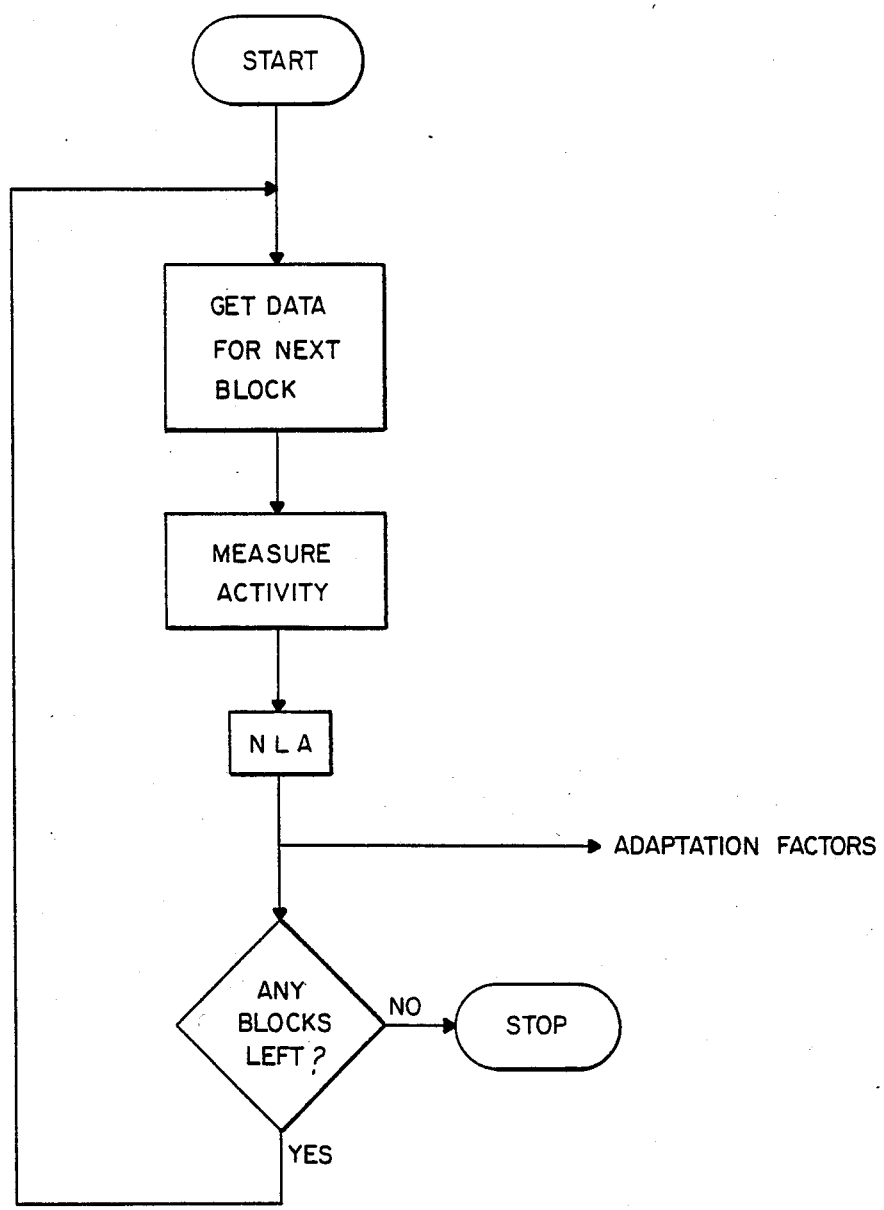
FIG. 2 is a flow chart showing a single-pass method for choosing adaptation factors.

The modulation index selector 15 can be any of several types. The blocks in which the modulation index (or equivalently the adaptation factor) is calculated, may be one, two, or three-dimensional, with both the complexity and efficiency increasing with dimensionality. The best value of the factor for each block is the largest possible value that falls just short of causing unacceptable distortion due to spectrum truncation by the channel. The adaptation factor can be calculated most simply by a one-pass algorithm operating on the signal within the block. FIG. 2 is a flow diagram of such an algorithm. The activity in each block is measured, and nonlinearly amplified to generate an adaptation factor for each block.

A suitable measure of the signal activity is the largest absolute value of the highs signal within the block. This measure predicts reasonably well the spectrum that will be produced by the modulator. Another suitable predictor is the largest absolute value of horizontal pel-to-pel difference signal in the block. A third suitable predictor is a linear combination of the first two measures. In all cases, the best relationship between the predictor and the modulation index can be found by the following procedure: Take a number of television frames representing typical subject matter. Divide these frames into blocks and calculate the predictor for each block. Entirely independently, determine the best index, m, for each block by a subjective experiment in which m is increased until the distortion is barely noticeable. Now plot the predictor values vs. the subjectively obtained m values. A scatter diagram results. The better the model (i.e., the better the "predictor" predicts the spectrum), the more the plotted points will reveal a simple monotonic relationship. Indeed, such behavior can be used to evaluate the algorithm. In any event, a relationship is chosen based on the scatter diagram and is incorporated into a nonlinear look-up table which is then used to transform the predictor into the index.

Figure 3:
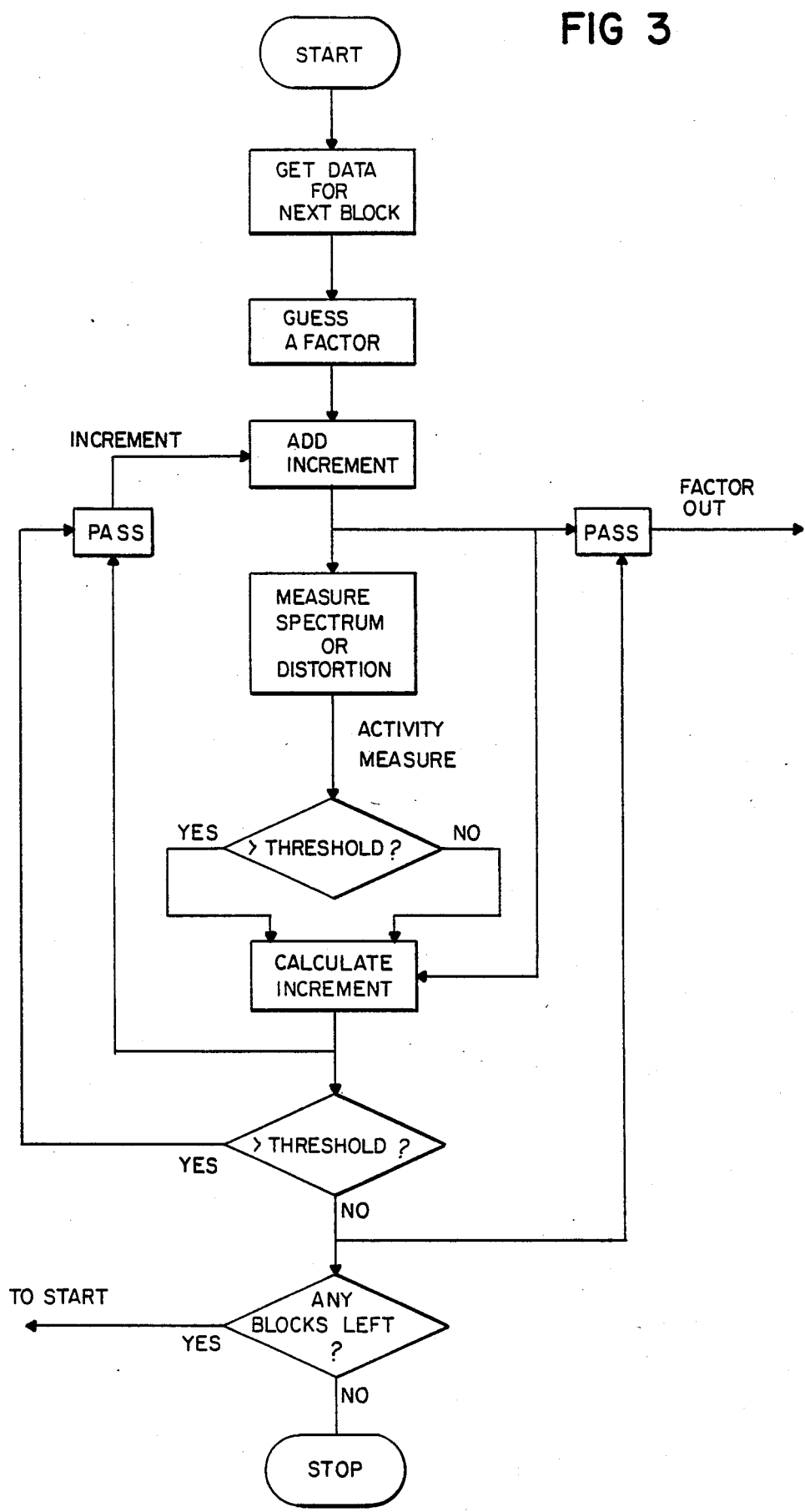
FIG. 3 is a flow chart showing a block-recursive method for choosing adaptation factors.

More complicated methods can be used to find better values of adaptation factor. For example, a recursive method can be used in which a measure of the spectrum of the modulated signal is used to successively modify the factor until the desired result is achieved. Instead of measuring the spectrum, some measure of the distortion in the demodulated signal can be used recursively to select the best factor. FIG. 3 is a flow diagram of a generalized recursive algorithm. It assumes that the image data is stored and that blocks can be retrieved as desired. The first block is retrieved, a factor guessed (a middle value, if there is no idea at all as to what it should be) and then incremented. (On the first iteration, there would be no increment.) A measurement is now made of the spectrum or the distortion and compared with a threshold. A calculation of the best increment is made based on this result and the increment compared with another threshold. If the increment is smaller than the least change in the adaptation factor, the process is finished and the previously calculated factor is output, after which the next block is retrieved, if there is any. If the increment is larger than the least possible change, the new increment is added and the distortion recomputed.

Recursive processes of this type can be sped up by using a "logarithmic search," in which the first guess is the middle value, from which it is determined whether the next guess should be higher or lower. Again, a middle value is chosen in the next search range, and so on. If there are n possible values of the factor, only at most log(base 2)n guesses are required to reach the final value, which number of guesses is a much smaller number than n. For a sequence of television frames in which each frame is divided into blocks and a value of m found for each block, the search may be shortened by using, for the first guess, the final value of m for the corresponding block in the previous field or frame.

Figure 4:
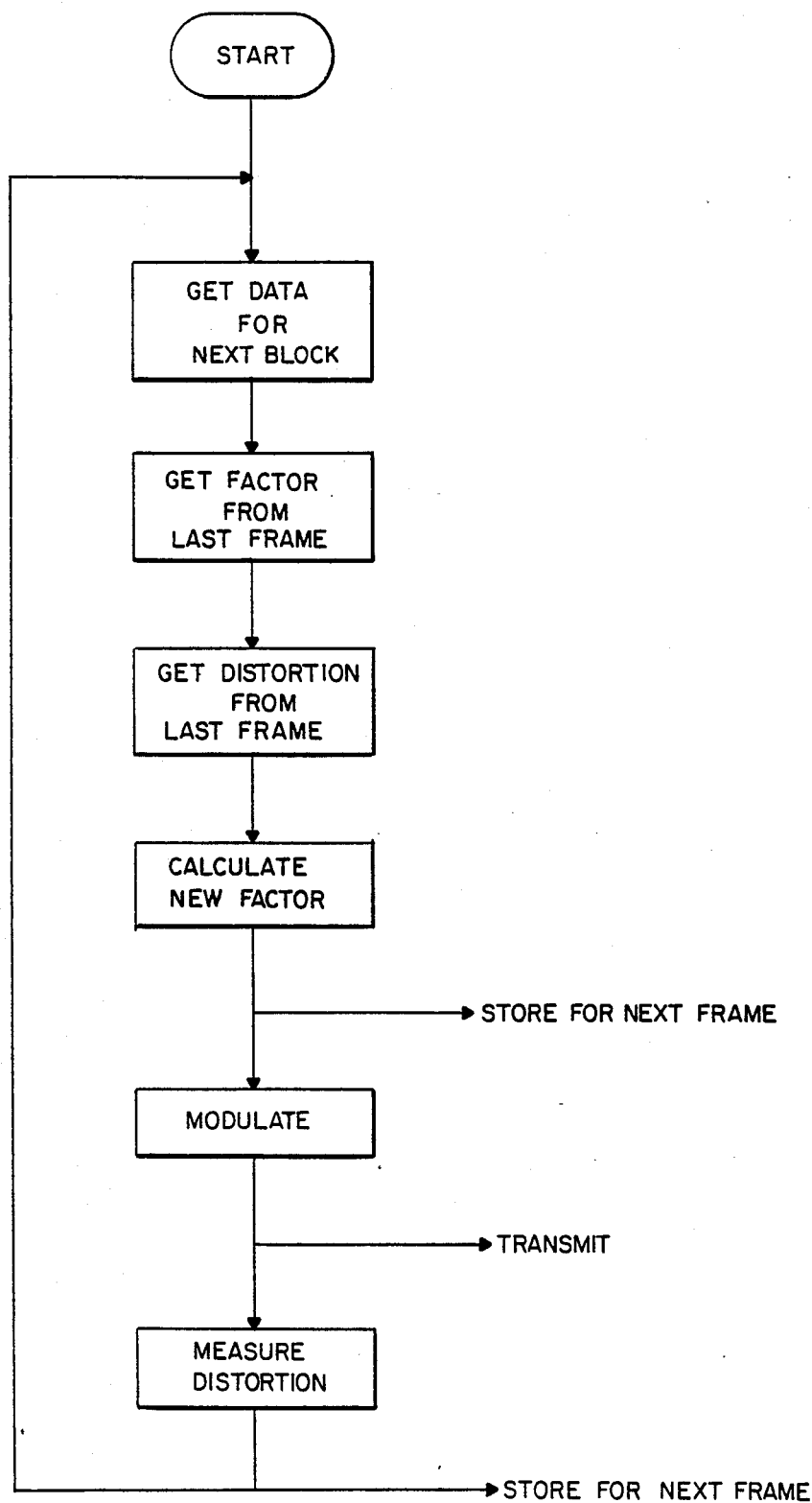
FIG. 4 is a flow chart showing a frame-recursive method for choosing adaptation factors.

A particularly advantageous method of calculating the adaptation factor for television signals is to use, for each block, the factor used for the corresponding block in the previous frame (or group of frames, in case of 3-dimensional blocks), increased or decreased as appropriate according to a measure of either the spectrum or the distortion that resulted from using said previous factor in said corresponding block in said previous frame. While this is also a recursive method, only one stage of recursion is required for each block in each frame. A flow chart for this algorithm is shown in FIG. 4, and, as can be seen, it is considerably simpler than that of FIG. 3. It is assumed that the image data is stored as well as the adaptation factors and distortion measures for the previous frame. The system retrieves the current block data as well as the factor and distortion of the corresponding block in the previous frame. The new factor is calculated, much as in FIG. 3. The modulated signal is transmitted and the resulting distortion in the present block is calculated. The distortion and adaptation factor are stored for use in the next frame.

Within the stationary areas of the image, this method gives the best possible results after a few frames. In these areas it converges to the same solution as the recursive method of FIG. 3. At the edges of moving areas, it is possible for the factor calculated in this manner to lag behind its optimum value. In that case, some improvement may be achieved by taking into account the factors used in several spatially adjacent blocks in one or more previous frames so as to give a better prediction of the appropriate factor for the current block, especially when the motion in question is at constant velocity.

It should be noted that when the pel with the highest busyness measure is located near the edge of a block and the neighboring block has a very low busyness, then interpolation, and, in particular, bilinear interpolation, may result in an adaptation factor at the busiest pel that is too high, resulting in distortion. This can be avoided by premeasuring the distortion using the interpolated factors at every pel, as would be done at the receiver. A less laborious method, which sacrifices a small amount of SNR but was nevertheless found to be satisfactory in the research leading to the Schreiber and Buckley paper, is simply to use, as a matter of course, somewhat lower adaptation factors than calculated.

The invention can be applied to color television. Normal FM has what is called a "triangular" noise spectrum; i.e., the noise rises linearly with its frequency. For monochrome images, this is advantageous, since the visibility of noise goes down with its frequency, at least at high frequencies. In the case of composite video signals such as in the NTSC system, however, the color information is modulated on a rather high-frequency carrier, so that excessive color noise may result from the predominantly high-frequency noise of the FM system. For this reason, most consumer recorders use the "color under" method, in which the high frequencies of the video signal, including the color subcarrier and its sidebands, are removed from the composite signal and remodulated onto a carrier of lower frequency than ("under") that used for the main video signal. They may also be recorded directly. Professional recorders keep the color carrier where it normally is and obtain the required SNR by using sufficient tape as well as as much high-frequency pre-emphasis as possible without excessive overload. In satellite transmission, the composite signal is also kept in its normal form, adequate SNR being achieved by the use of sufficient transmitter power and rf bandwidth.

The present invention primarily improves the SNR of the low-frequency and/or low amplitude portions of the signal. In the case of very bright, saturated colors that result in high-amplitude color signals, little noise reduction is possible in the composite signal format because the normal rf signal already produces a rather broad-band signal in the channel. Therefore it is preferable, in this case, to separate the signal into its components before recording. This can be done with any known color demodulator. Alternatively, component signals can be taken directly from a TV camera or from a TV production system that operates in the component, rather than composite, fashion.

Figure 5:
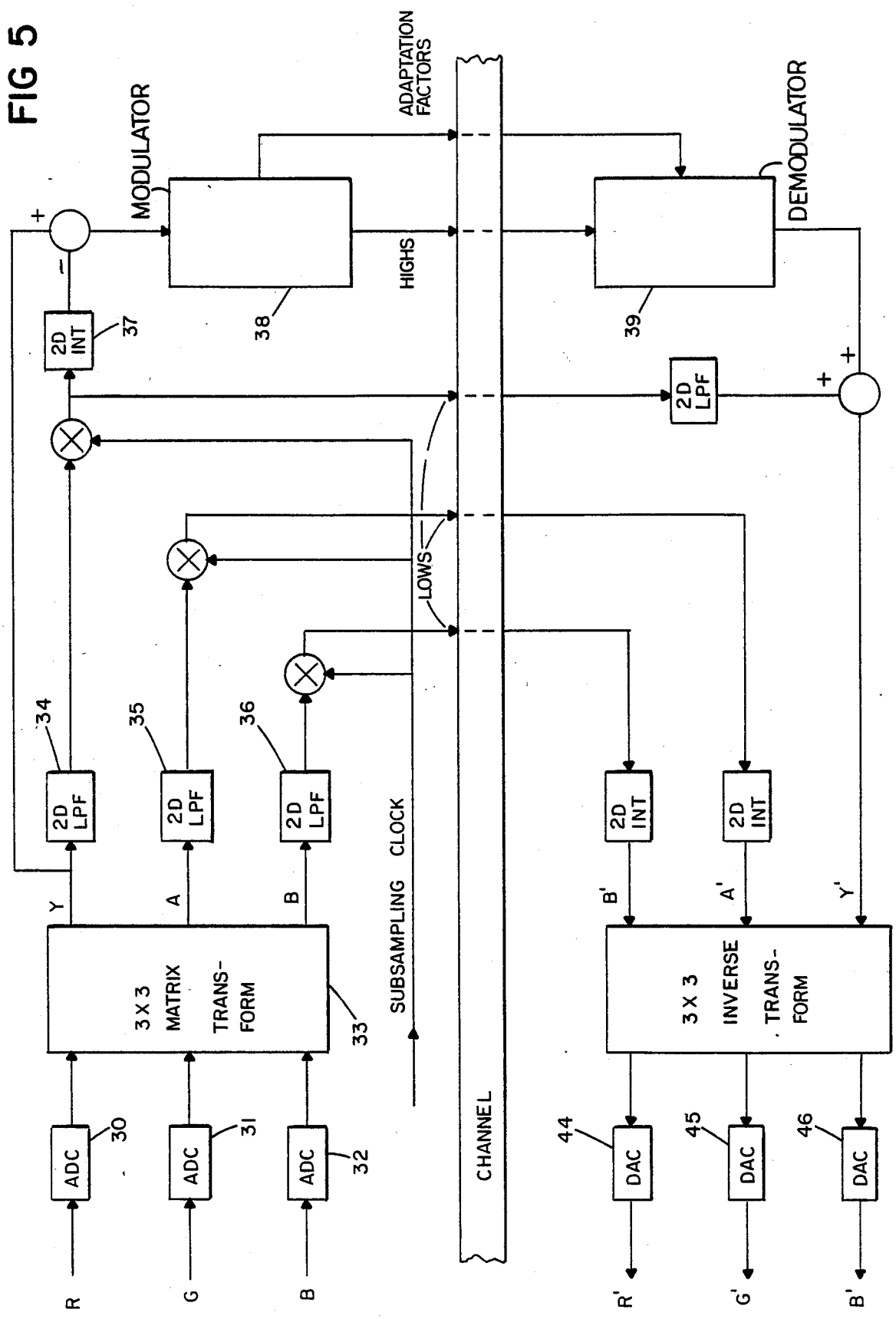
FIG. 5 is a block diagram of a preferred embodiment for transmitting color television signals.

A suitable application to color transmission using the teachings of the invention and the "mixed highs" color representation is shown in FIG. 5. In the mixed highs representation, three low-resolution color signals are used together with a high-frequency luminance signal. This has been shown to give very good results with a substantial economy of bandwidth, due to the eye's limited color resolution. Red, blue, and green (RGB) analog video signals are input to the system from one of the afore-mentioned sources. These are digitized in analog-to-digital converters 30-32 and the balance of the operations carried out digitally. At the receiver, digital signals, R'G'B', of comparable quality to the originals, are produced and converted into analog signals by digital-to analog converters 44-46.

At the transmitter, the digitized input signals are applied to a linear 3×3 matrix transformer 33 and converted to luminance Y and two color-difference signals A, B which may be of any known kind. All three signals are then passed through low-pass filters 34-36. (These filters may be one-, two-, or three-dimensional (x, y, t), with increasing complexity and efficiency. Two-dimensional filters are shown here for convenience.) The low-passed signals are subsampled and transmitted by any known method. The low-pass luminance signal is interpolated and subtracted from the digital luminance signal to produce luminance highs. The latter are now frequency-modulated onto a carrier and transmitted by the same method as in FIG. 1, or any variant thereof discussed herein. For clarity, all of the FM-related processing, previously discussed in detail in connection with FIG. 1 (and shown within dashed lines in FIG. 1) is collected in modulator 38 and demodulator 39. Note that the block adaptation factors must be transmitted, as before, as a separate signal. In color television systems where very high chrominance resolution is desired, then the adaptive technique may be applied to all three components, with the same or different adaptation factors being used.

In a practical case using 525-line, 30 frame/sec interlaced scanning, with 2-d blocks, the blocks could be 3 lines high by 5 pels long, or 15 pels/block. For analog transmission of RGB lows and adaptation information, each of these four signals would require 1/15 the bandwidth of the highs signal, or 4/15 in all. Eight fields would be a suitable length for 3-d blocks, for a block size of 120 pels. The use of 3-d rather than 2-d blocks reduces by 8 the required transmission bandwidth for lows and adaptation, making it negligible. Such a low rate makes feasible the use of digital transmission, which is highly desirable, at least for the adaptation information. Using 8 bits/pel for each color signal and 8 bits for the adaptation information, this is 32/120 or 0.27 bits/original pel. For a nominal rate of 8.4 million pels/sec, corresponding to 4.2 MHz bandwidth, 2.24 Mbits/sec would be required for this extra information. It is quite feasible to provide such a digital channel using a portion of the satellite channel for the purpose, the remainder being used for FM for the luminance highs signal. Of course, audio transmission must also be provided, and this could be done by time-multiplexing the audio information into the retrace intervals of the highs signal, in either analog or digital form. As previously mentioned in connection with FIG. 1, the lows signals as well as the adaptation information can be transmitted by the MAC technique.

Although component color video signals produce better performance than composite signals using the teachings of this invention, it is nevertheless possible to use composite signals in the system of FIG. 1 and achieve useful results. For such signals, the division into low- and high-frequency components would preferably result in the color subcarrier and its sidebands being entirely contained within the highs component. Even in the case of subcarrier signals of maximum amplitude, some reduction of dynamic range of the signal, and therefore of bandwidth in the channel, occurs since the subcarrier in the highs signal is not superimposed on the luminance signal, as it is in conventional systems. Thus, some degree of adaptive increase in the modulation index, and corresponding increase in the receiver SNR is possible. For chrominance signals of less than maximum amplitude, which actually are much more common, substantial noise reduction is accomplished by using the methods discussed previously for monochrome signals. In the case of neutral colors, of course, the same high level of noise reduction is achieved as in monochrome signals.

The invention may also be applied to audio transmission or recording. The essential feature of a signal that makes it amenable to improvement using the teachings of this invention is that noise is most apparent in sections of low amplitude and/or frequency and is masked within and adjacent to areas of high amplitude and/or frequency. This is true for audio as for video, with some differences due to the fact that audio is inherently one-dimensional and because the masking effect, which is spatially isotropic in video, is somewhat asymmetrical in audio. Noise just before a loud passage is masked less than noise just afterwards. This asymmetry limits the effectiveness of prior-art methods of adaptive audio modulation in which the adaptation factor is not separately transmitted, but is inferred from the received signal level.

To use the invention for audio, the blocks over which the adaptation factor is calculated should be asymmetrical, extending perhaps 200-400 milliseconds (msec) before the sample in question and 50-100 msec afterward. With a block length of about 350 msec, a bandwidth of about 1.4 KHz would suffice for adaptation transmission, which is small compared with the 15 KHz or so required for high-quality audio.

Other embodiments of the invention are within the following claims. For example, some or all of the digital processing could be replaced with analog or hybrid analog-digital hardware although digital processing of signals is often cheaper and/or more convenient and accurate than analog processing.

What is claimed is:

1. A system for processing a signal representative of information, such as sound or the high frequency content of a visual image, for which human perception of noise is greater in areas of low amplitude and/or frequency and reduced in and immediately adjacent to areas of high amplitude and/or frequency, comprising:
   modulation means for frequency modulating a carrier with said signal using a variable modulation index,
   adaptation means for varying said variable modulation index to widen the spectrum of the modulated carrier for selected segments of said signal.

2. The system of claim 1 wherein said signal is the high-frequency component of said visual image and further comprising spectrum-dividing means for spatially and/or temporally filtering said signal to produce a low-frequency component representative of luminance variations in a low-frequency band and a high-frequency component representative of luminance variations in a high-frequency band located spectrally above said low-frequency band.

3. The system of claim 2 wherein said adaptation means includes means for assigning a different valve of said variable modulation index to each of a plurality of blocks within said image.

4. The system of claim 3 wherein said blocks are equal in size.

5. The system of claim 4 wherein said size ranges from 4 to 512 picture elements.

6. The system of claim 2 wherein said adaptation means includes means for assigning said different values of said variable modulation index to specific locations within said image and spatial and/or temporal interpolation means for choosing a value of said variable modulation index at points between said specific locations by spatial and/or temporal interpolation.

7. The system of claim 3 wherein said adaption means includes means for assigning said different values of said variable modulation index to the centers of said blocks and interpolation means for choosing a value of said variable modulation index at locations between said centers by interpolation.

8. The system of claim 2 wherein said adaptation means includes means for making said variable modulation index a function of an image characteristic that is correlated with the width of the short-term spectrum of the modulated carrier.

9. The system of claim 8 wherein said image characteristic is the magnitude of said high-frequency component.

10. The system of claim 8 wherein said image characteristic is the rate of change of said high-frequency component.

11. The system of claim 8 wherein said adaptation means includes means for assigning a different valve of said variable modulation index to each of a plurality of blocks within said image and making said modulation index within each block a function of the highest value of said image characteristic within that block.

12. The system of claim 8 wherein said function is nonlinear.

13. The system of claim 8 wherein said adaptation means includes means for determining said short-term spectrum in real time for different areas of said image and increasing said variable modulation index, and thereby said short term spectrum, in those areas where less than the available bandwidth would otherwise be used.

14. The system of claim 2 wherein said adaptation means includes means for measuring transmission error owing to the short-term spectrum exceeding the available bandwidth and increasing said variable modulation index until a predetermined small error results.

15. The system of 2 wherein said adaptation means includes means for varying said variable modulation index sufficiently gradually across said image as to make the modulation of said modulation means more linear than that provided by static nonlinear companding.

16. The system of claim 2 wherein said spectrum-dividing means includes means for filtering said signal in one dimension (x, y, or t).

17. The system of claim 2 wherein said spectrum-dividing means includes means for filtering said signal in two dimensions (x and y).

18. The system of claim 2 wherein said spectrum-dividing means includes means for filtering said signal in three dimensions (x, y, and t).

19. The system of claim 2 further comprising means for statically companding said high-frequency component.

20. The system of claim 19 wherein said static companding attenuates high amplitudes less than low amplitudes.

21. The system of claim 2 wherein said signal representing said visual image is an analog television signal.

22. The system of claim 2 wherein said signal representing said visual image is a component color television signal and said spectrum-dividing means includes means for processing said signal to separate it into a mixed high-frequency component and separate low-frequency components for each color.

23. The system of claim 2 wherein said modulating means includes means for narrow-index frequency modulation.

24. The system of claim 2 further comprising means for transmitting said high-frequency component through a first channel, said low-frequency component through a second channel, and said variable modulation index through a third channel.

25. The system of claim 24 wherein said second and third channels are digital.

26. The system of claim 24 wherein said second and third channels are analog.

27. The system of claim 24 further comprising sub-sampling means for subsampling said low-frequency component before transmission at a spatial sampling rate lower than that associated with said high-frequency component.

28. The system of claim 24 further comprising means for demodulating said frequency modulated carrier using said transmitted modulation index.

29. The system of claim 2 wherein said adaptation means includes means for selecting the valve of said variable modulation index so that the valve of said index for a given point in the image depends on the image activity in the neighborhood of the point rather than only on the activity at the particular point, thereby taking advantage of the fact that high activity at one point in an image suppresses noise visibility in an area around that point.

30. The system of claim 2 wherein the variation in the variable modulation index from one area of the image to another is greater than ten-to-one.

31. The system of claim 30 wherein said variation is greater than 32-to-1.

32. The system of claim 3 wherein said adaptation means includes means for determining said variable modulation index using a single-pass procedure in which the index is computed for each block based on a characteristic of the image within that block.

33. The system of claim 3 wherein said adaptation means includes means for determining said variable modulation index by following a recursive procedure in which (1) the index (or equivalently the adaptation factor) is varied for a particular said block, said variation resulting in distortion in a demodulated signal generated by demodulating the modulated carrier signal (2) the effect of the variation on the distortion in the demodulated signal is determined by examining a measure or predictor of that distortion, and (3) a decision is made as to whether to further increase the variable modulation index based on the degree of distortion.

34. The system of claim 33 wherein said adaptation means includes means for varying said variable modulation index until the distortion exceeds a predetermined small level.

35. The system of claim 33 wherein said adaptation means includes means for varying said variable modulation index using a logarithmic search.

36. The system of claim 3 wherein said adaptation means includes means for starting a search for the value of the variable modulation index for a block with the valve of the index used for the same block in the previous frame.

37. The system of claim 33 wherein said adaptation means includes means for starting said recursive procedure for a block with the valve of the index used for the same block in the previous frame.

38. The system of claim 33 wherein the distortion in the demodulated signal is calculated for each picture element (as opposed to each block) of the image prior to transmission, and the variable modulation index revised if undesirably high distortion results.

39. The system of claim 2 wherein said adaptation means is implemented with digital circuitry.

40. The system of claim 8 wherein said adaptation means includes means for assigning a different valve of said variable modulation index to each of a plurality of blocks within said image, and said image characteristic is the largest pel-to-pel horizontal difference in a block.

41. The system of claim 3 wherein said adaptation means includes means for calculating the valve of said variable modulation index for a block from (1) the modulation index used for the same block in the previous frame and (2) either the spectrum or a distortion that resulted from using that valve of the index for that block in the previous frame.

42. The system of claim 40 wherein said image characteristic is a linear combination of the highest amplitude and the highest pel-to-pel horizontal difference.

43. The system of claim 1 wherein said adaptation means includes means for making said variable modulation index a function of a signal characteristic that is correlated with the width of said spectrum.

44. The system of claim 43 wherein said signal is representative of sound and said characteristic is the rate of change of sound amplitude.

45. The system of claim 1 wherein said adaptation means includes means for determining said spectrum in real time for different time blocks of said signal and increasing said variable modulation index, and thereby said spectrum, in those blocks where less than the available bandwidth would otherwise be used.

46. The system of claim 1 wherein said adaptation means includes means for measuring a transmission error across said channel (owing to said spectrum exceeding the available bandwidth) and increasing said variable modulation index until a predetermined small error results.

47. The system of 1 wherein said adaptation means includes means for varying said variable modulation index sufficiently gradually across said image so as to make the modulation of said variable modulation index more linear than that provided by static nonlinear companding.

48. The system of claim 1 further comprising means for statically companding said signal.

49. The system of claim 48 wherein said static companding attenuates high amplitudes less than low amplitudes (opposite conventional companding).

50. The system of claim 1 wherein said adaptation means includes means for determining said variable modulation index by following a recursive procedure in which (1) the index (or equivalently the adaptation factor) is varied for a particular block of said signal, said variation resulting in distortion in a demodulated signal generated by demodulating the modulated carrier signal (2) the effect of the variation on distortion in the demodulated signal is determined by examining a measure or predictor of that distortion, and (3) a decision is made as to whether to further vary the variable modulation index based on the degree of distortion.

51. The system of claim 50 wherein said adaptation means includes means for varying said index until the distortion exceeds a predetermined small level.

52. The system of claim 50 wherein said adaptation means includes means for varying said variable modulation index using a logarithmic search.

53. The system of claim 50 wherein the distortion in the demodulated signal is calculated for each sample of said signal (as opposed to each block) prior to transmission, and the variable modulation index revised if undesirably high distortion results.

54. The system of claim 1 wherein said adaptation means is implemented with digital circuitry.

55. The system of claim 1 wherein said signal represents sound, and said adaptation means includes means for assigning a different valve of said variable modulation index to each of a plurality of blocks of time in said signal.

56. The system of claim 55 wherein said adaptation means includes means for making the variable modulation index for a particular sample is based on an asymmetrically located block, extending further before the sample in time than after it.

57. The system of claim 56 wherein said asymmetrically located block is on the order of 250 to 500 milliseconds long, and extends 50 to 100 milliseconds afterward of a sample and 200 to 400 milliseconds before.

58. The system of claim 2 wherein said signal representing a visual image is a composite color television signal and said spectrum dividing means includes means for dividing said composite signal into separate high and low-frequency components, the high-frequency component being a composite signal.

59. The system of claim 3 wherein said adaptation means includes means for determining said variable modulation index by following a frame-recursive procedure in which the valve of said index (or equivalently the adaptation factor) is calculated for a block in the current frame based, at least in part, on the valve of said used for the same block in the previous frame and on a measure of the distortion that resulted in the previous frame.

* * * * *